US008054515B2

(12) United States Patent
Yamakado et al.

(10) Patent No.: US 8,054,515 B2
(45) Date of Patent: *Nov. 8, 2011

(54) IMAGE ARRANGEMENT FOR ELECTRONIC ALBUM

(75) Inventors: Hitoshi Yamakado, Nagano-ken (JP); Yu Gu, Nagano-ken (JP); Toru Miyamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/802,213

(22) Filed: Jun. 1, 2010

(65) Prior Publication Data

US 2010/0239176 A1    Sep. 23, 2010

Related U.S. Application Data

(63) Continuation of application No. 11/066,856, filed on Feb. 24, 2005, now Pat. No. 7,746,512.

(30) Foreign Application Priority Data

Feb. 26, 2004 (JP) ................................ 2004-050780

(51) Int. Cl.
*H04N 1/04* (2006.01)
(52) U.S. Cl. ........ 358/474; 358/450; 358/1.18; 358/1.9; 382/224; 382/167; 348/239; 348/231.99; 715/732; 715/517; 345/156

(58) Field of Classification Search .................. 358/474, 358/453, 1.15, 450, 527, 1.18, 1.9; 348/231.4, 348/231.99, 239, E5.051; 382/305, 209, 382/307, 224, 217, 162, 163, 167; 395/117, 395/11; 345/156, 441; 715/732, 517, 520, 715/723, 731
See application file for complete search history.

(56) References Cited

U.S. PATENT DOCUMENTS 4,823,303 A * 4/1989 Terasawa ...................... 715/201
4,992,781 A * 2/1991 Iwasaki et al. ................ 345/640
(Continued)

FOREIGN PATENT DOCUMENTS

JP        11-344771        12/1999
(Continued)

OTHER PUBLICATIONS

Abstract of Japanese Patent Publication No. 11-344771, Pub. Date: Dec. 14, 1999, Patent Abstracts of Japan.

(Continued)

*Primary Examiner* — Negussie Worku
(74) *Attorney, Agent, or Firm* — Martine Penilla Group, LLP

(57) ABSTRACT

An image ordering rule is selected from among multiple image ordering rules that use mutually different types of image characteristic values to determine the order of arrangement of images. The image characteristic value used by the selected image ordering rule is obtained for each of a plurality of images. The order of arrangement of a plurality of images is determined based on the selected image ordering rule and the image characteristic values for a plurality of images. The number of images to be placed on each page is determined based on the maximum number of images that can be included in each page of the electronic album. An electronic album in which a plurality of images are laid out on multiple pages in sequential order is created in accordance with the order of arrangement of a plurality of images and the number of images to be placed on each page.

15 Claims, 9 Drawing Sheets

U.S. PATENT DOCUMENTS

| | | | | |
|---|---|---|---|---|
| 5,563,722 | A * | 10/1996 | Norris | 358/453 |
| 6,147,768 | A * | 11/2000 | Norris | 358/1.18 |
| 6,324,545 | B1 * | 11/2001 | Morag | 707/737 |
| 6,766,332 | B2 * | 7/2004 | Miyazaki et al. | 1/1 |
| 7,019,871 | B2 * | 3/2006 | Risheq | 358/474 |
| 7,046,258 | B1 * | 5/2006 | Naito et al. | 345/619 |
| 7,079,293 | B2 * | 7/2006 | Risheq | 358/474 |
| 7,274,834 | B2 * | 9/2007 | Hung | 382/305 |
| 7,349,010 | B2 * | 3/2008 | Bryant et al. | 348/207.1 |
| 7,362,963 | B2 * | 4/2008 | Lin | 386/332 |
| 7,369,164 | B2 | 5/2008 | Parulski et al. | |
| 7,440,682 | B2 | 10/2008 | Habuta et al. | |
| 7,443,418 | B2 | 10/2008 | Bryant et al. | |
| 7,453,437 | B2 | 11/2008 | Inui | |
| 7,477,805 | B2 | 1/2009 | Ohtsuka et al. | |
| 7,602,522 | B2 * | 10/2009 | Fu et al. | 358/1.18 |
| 7,689,909 | B1 * | 3/2010 | Szuszczewicz | 715/243 |
| 2002/0101539 | A1 | 8/2002 | Yokota | |
| 2003/0142953 | A1 | 7/2003 | Terada et al. | |
| 2003/0160824 | A1 | 8/2003 | Szumla | |
| 2004/0076398 | A1 | 4/2004 | Chai | |
| 2004/0201752 | A1 * | 10/2004 | Parulski et al. | 348/231.99 |
| 2004/0201871 | A1 | 10/2004 | Risheq | |
| 2005/0117032 | A1 | 6/2005 | Ueda et al. | |
| 2005/0200912 | A1 * | 9/2005 | Yamakado et al. | 358/450 |
| 2005/0259949 | A1 | 11/2005 | Habuta et al. | |
| 2006/0055977 | A1 * | 3/2006 | Shiota et al. | 358/1.18 |
| 2006/0055992 | A1 | 3/2006 | Koo | |
| 2006/0221779 | A1 | 10/2006 | Matsushita et al. | |
| 2008/0030815 | A1 * | 2/2008 | Teicher et al. | 358/527 |
| 2008/0107331 | A1 * | 5/2008 | Kojima et al. | 382/162 |

FOREIGN PATENT DOCUMENTS

| | | |
|---|---|---|
| JP | 2000-082127 | 3/2000 |
| JP | 2003-211774 | 7/2003 |

OTHER PUBLICATIONS

Abstract of Japanese Patent Publication No. 2000-082127, Pub. Date: Mar. 21, 2000, Patent Abstracts of Japan.

Abstract of Japanese Patent Publication No. 2003-211774, Pub. Date: Jul. 29, 2003, Patent Abstracts of Japan.

* cited by examiner

Fig.7A

NUMBER OF IMAGES PER PAGE
MAX = 2 images per page

| Number of images | Number of pages | | | | | |
|---|---|---|---|---|---|---|
| | p1 | p2 | p3 | p4 | p5 | p6 |
| 1 | 1 | | | | | |
| 2 | 2 | | | | | |
| 3 | 2 | 1 | | | | |
| 4 | 2 | 2 | | | | |
| 5 | 2 | 2 | 1 | | | |
| 6 | 2 | 2 | 2 | | | |
| 7 | 2 | 2 | 2 | 1 | | |
| 8 | 2 | 2 | 2 | 2 | | |
| 9 | 2 | 2 | 2 | 2 | 1 | |
| 10 | 2 | 2 | 2 | 2 | 2 | |
| 11 | 2 | 2 | 2 | 2 | 2 | 1 |
| 12 | 2 | 2 | 2 | 2 | 2 | 2 |
| 13 | 2 | 2 | 2 | 2 | 2 | 2 |
| 14 | 2 | 2 | 2 | 2 | 2 | 2 |
| 15 | 2 | 2 | 2 | 2 | 2 | 2 |
| 16 | 2 | 2 | 2 | 2 | 2 | 2 |
| 17 | 2 | 2 | 2 | 2 | 2 | 2 |
| 18 | 2 | 2 | 2 | 2 | 2 | 2 |
| 19 | 2 | 2 | 2 | 2 | 2 | 2 |
| 20 | 2 | 2 | 2 | 2 | 2 | 2 |

Fig.7B

NUMBER OF IMAGES PER PAGE
MAX = 3 images per page

| Number of images | Number of pages | | | | | |
|---|---|---|---|---|---|---|
| | p1 | p2 | p3 | p4 | p5 | p6 |
| 1 | 1 | | | | | |
| 2 | 2 | | | | | |
| 3 | 3 | | | | | |
| 4 | 2 | 2 | | | | |
| 5 | 3 | 2 | | | | |
| 6 | 3 | 3 | | | | |
| 7 | 3 | 2 | 2 | | | |
| 8 | 3 | 3 | 2 | | | |
| 9 | 3 | 3 | 3 | | | |
| 10 | 3 | 3 | 2 | 2 | | |
| 11 | 3 | 3 | 3 | 2 | | |
| 12 | 3 | 3 | 3 | 3 | | |
| 13 | 3 | 3 | 3 | 2 | 2 | |
| 14 | 3 | 3 | 3 | 3 | 2 | |
| 15 | 3 | 3 | 3 | 3 | 3 | |
| 16 | 3 | 3 | 3 | 3 | 2 | 2 |
| 17 | 3 | 3 | 3 | 3 | 3 | 2 |
| 18 | 3 | 3 | 3 | 3 | 3 | 3 |
| 19 | 3 | 3 | 3 | 3 | 3 | 3 |
| 20 | 3 | 3 | 3 | 3 | 3 | 3 |

Fig.7C

NUMBER OF IMAGES PER PAGE
MAX = 4 images per page

| Number of images | Number of pages | | | | |
|---|---|---|---|---|---|
| | p1 | p2 | p3 | p4 | p5 |
| 1 | 1 | | | | |
| 2 | 2 | | | | |
| 3 | 3 | | | | |
| 4 | 4 | | | | |
| 5 | 3 | 2 | | | |
| 6 | 3 | 3 | | | |
| 7 | 4 | 3 | | | |
| 8 | 4 | 4 | | | |
| 9 | 3 | 3 | 3 | | |
| 10 | 4 | 3 | 3 | | |
| 11 | 4 | 4 | 3 | | |
| 12 | 4 | 4 | 4 | | |
| 13 | 4 | 3 | 3 | 3 | |
| 14 | 4 | 4 | 3 | 3 | |
| 15 | 4 | 4 | 4 | 3 | |
| 16 | 4 | 4 | 4 | 4 | |
| 17 | 4 | 4 | 3 | 3 | 3 |
| 18 | 4 | 4 | 4 | 3 | 3 |
| 19 | 4 | 4 | 4 | 4 | 3 |
| 20 | 4 | 4 | 4 | 4 | 4 |

Fig.7D

NUMBER OF IMAGES PER PAGE
MAX = 5 images per page

| Number of images | Number of pages | | | |
|---|---|---|---|---|
| | p1 | p2 | p3 | p4 |
| 1 | 1 | | | |
| 2 | 2 | | | |
| 3 | 3 | | | |
| 4 | 4 | | | |
| 5 | 5 | | | |
| 6 | 3 | 3 | | |
| 7 | 4 | 3 | | |
| 8 | 4 | 4 | | |
| 9 | 5 | 4 | | |
| 10 | 5 | 5 | | |
| 11 | 4 | 4 | 3 | |
| 12 | 4 | 4 | 4 | |
| 13 | 5 | 4 | 4 | |
| 14 | 5 | 5 | 4 | |
| 15 | 5 | 5 | 5 | |
| 16 | 4 | 4 | 4 | 4 |
| 17 | 5 | 4 | 4 | 4 |
| 18 | 5 | 5 | 4 | 4 |
| 19 | 5 | 5 | 5 | 4 |
| 20 | 5 | 5 | 5 | 5 |

Fig.7E

NUMBER OF IMAGES PER PAGE
MAX = 6 images per page

| Number of images | Number of pages | | | |
|---|---|---|---|---|
| | p1 | p2 | p3 | p4 |
| 1 | 1 | | | |
| 2 | 2 | | | |
| 3 | 3 | | | |
| 4 | 4 | | | |
| 5 | 5 | | | |
| 6 | 6 | | | |
| 7 | 4 | 3 | | |
| 8 | 4 | 4 | | |
| 9 | 5 | 4 | | |
| 10 | 5 | 5 | | |
| 11 | 6 | 5 | | |
| 12 | 6 | 6 | | |
| 13 | 5 | 4 | 4 | |
| 14 | 5 | 5 | 4 | |
| 15 | 5 | 5 | 5 | |
| 16 | 6 | 5 | 5 | |
| 17 | 6 | 6 | 5 | |
| 18 | 6 | 6 | 6 | |
| 19 | 5 | 5 | 5 | 4 |
| 20 | 5 | 5 | 5 | 5 |

Fig.8
FIRST GROUP
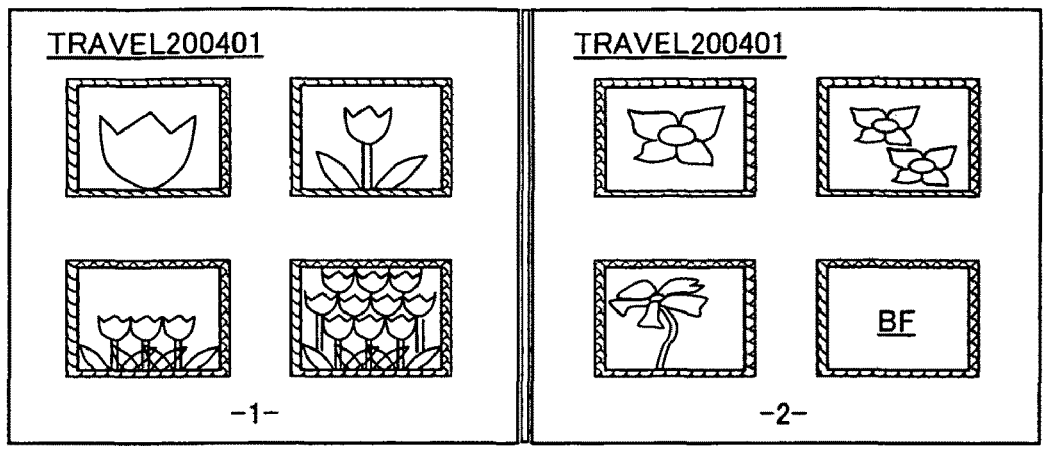
SECOND GROUP
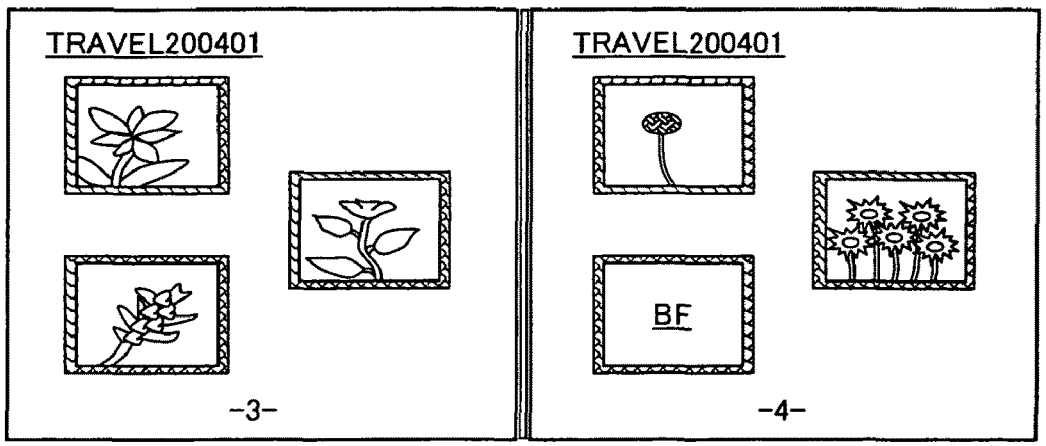

IMAGE ARRANGEMENT FOR ELECTRONIC ALBUM

CROSS-REFERENCE TO RELATED APPLICATIONS

This application is a continuation of application Ser. No. 11/066,856, filed on Feb. 24, 2005 now U.S. Pat. No. 7,746,512, the disclosure of which is hereby incorporated by reference in its entirety for all purposes.

BACKGROUND OF THE INVENTION

1. Field of the Invention

The present invention relates to a technology for arranging a plurality of images in an electronic album in a preferred sequential order.

2. Description of the Related Art

The widespread use of digital cameras and camera-equipped cellular telephones in recent years has sparked rapid development in the field of digital photography. This has given rise to a trend toward the use of an 'electronic album' comprising a photo album composed of digital photographs stored on a computer.

In a conventional electronic album, the order of photographs is fixed according to the order of photo-taking or the like. Furthermore, in order to change the image order to a preferred order, the user must manually instruct the movement of images that extend across pages, which may be inconvenient. Moreover, a sufficiently innovative approach has not been taken with regard to the number of images allocated to each page.

SUMMARY OF THE INVENTION

An object of the present invention is to provide a technology whereby a plurality of images can be arranged easily in a preferred order. Another object is to provide a technology whereby the number of images to be allocated to each page can be automatically and easily set.

In one aspect of the present invention, there is provided a method for creating an electronic album including a plurality of images with the aid of a computer. The method comprises: (a) selecting an image ordering rule from among a plurality of image ordering rules used to determine an order of arrangement of the plurality of images based on different types of image characteristic values; (b) acquiring for each of the plurality of images the image characteristic value used in the selected image ordering rule; (c) determining the order of arrangement of the plurality of images in accordance with the selected image ordering rule and the image characteristic values for the plurality of images; (d) determining the number of images to be placed on each page of the electronic album; and (e) creating, in accordance with the order of arrangement of the plurality of images and the number of images on each of the pages, an electronic album in which the plurality of images are arranged in order across multiple pages.

Since an image ordering rule can be selected from among a plurality of image ordering rules, a desired arrangement can be selected. Moreover, since an image characteristic value used by the selected rule can be obtained for each image and a plurality of images arranged in accordance with the image characteristic value for each image and the image ordering rule, a plurality of images can be easily arranged in the desired order.

In another aspect of the present invention, the electronic album creating method comprises: (i) determining an order of arrangement of the plurality of images in accordance with a designated image ordering rule, the image ordering rule using an image characteristic value acquired for each image; (ii) determining the number of images to be placed on each page of the electronic album; and (iii) creating, in accordance with the order of arrangement of the plurality of images and the number of images on each of the pages, an electronic album in which the plurality of images are arranged in order across multiple pages. The step (i) includes classifying the plurality of images into multiple groups in accordance with the image characteristic values for the plurality of images arranged in sequence, and the step (ii) includes determining the number of images to be placed on each page such that images from different groups are not allocated to the same page.

According to this method, images can be arranged on each page in an ordered fashion and the number of images allocated to each page can be automatically and easily set.

The present invention may be realized in various forms, such as through an image order determining method and apparatus, an electronic album creating method and apparatus, an electronic album image processing method and apparatus, a computer program for implementing the functions of these methods or apparatuses, or a recording medium on which such computer program is recorded.

These and other objects, features, aspects, and advantages of the present invention will become more apparent from the following detailed description of the preferred embodiments with accompanying drawings.

BRIEF DESCRIPTION OF THE DRAWINGS

FIGS. 7A-7E show the per-page number of images determined according to the process shown in FIG. 6; and FIG. 8 is an explanatory drawing showing an example of album images.

DESCRIPTION OF THE PREFERRED EMBODIMENT

Embodiments of the present invention will be described below according to the following sequence.

A. Device construction and processing in an embodiment
B. Variations

Figure 1:
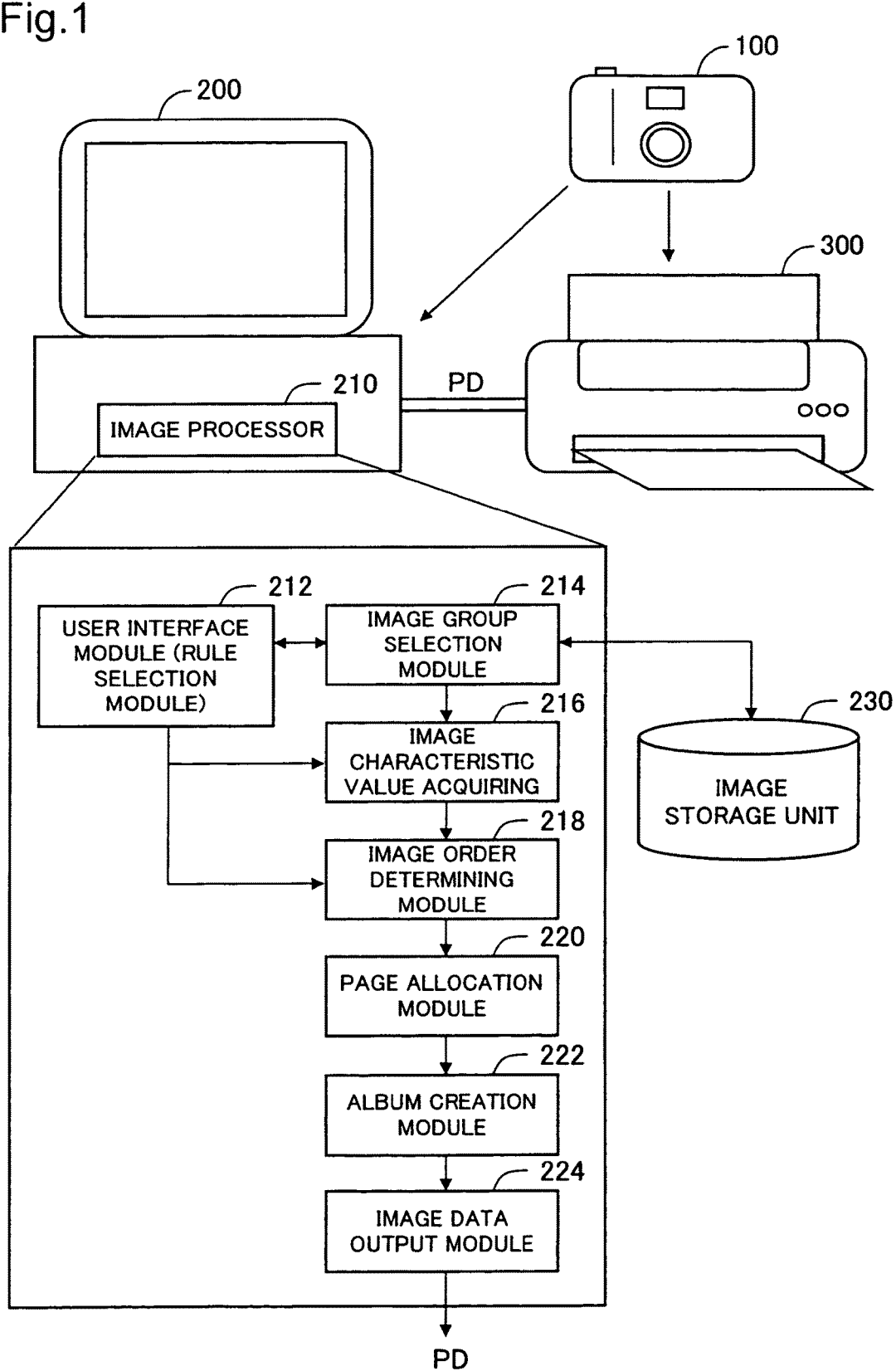
FIG. 1 is an explanatory drawing showing an image processing system embodying the present invention.

A. Device Construction and Processing in an Embodiment:

FIG. 1 is an explanatory drawing showing an image processing system embodying the present invention. This image processing system includes a digital camera 100, a computer 200 and a color printer 300. The computer 200 includes an image processor 210 that executes processing to create an electronic album. This image processor 210 may alternatively be incorporated in the digital camera 100 or in the color printer 300.

The image processor 210 has a user interface module 212, an image group selection module 214, an image characteristic value acquiring module 216, an image order determining module 218, a page allocation module 220, an album creating module 222 and an image data output module 224. A plurality of images used as material for the electronic album are stored in an image storage unit 230. These images are normally photographic images, but images obtained by a scanner or via computer graphics may also be used as material for album. As described below, the user interface module 212 (FIG. 1) has a function to serve as a rule selection module used when the user selects an image ordering rule. The functions of the various constituent elements of the image processor 210 are realized via a computer program.

Figure 2:
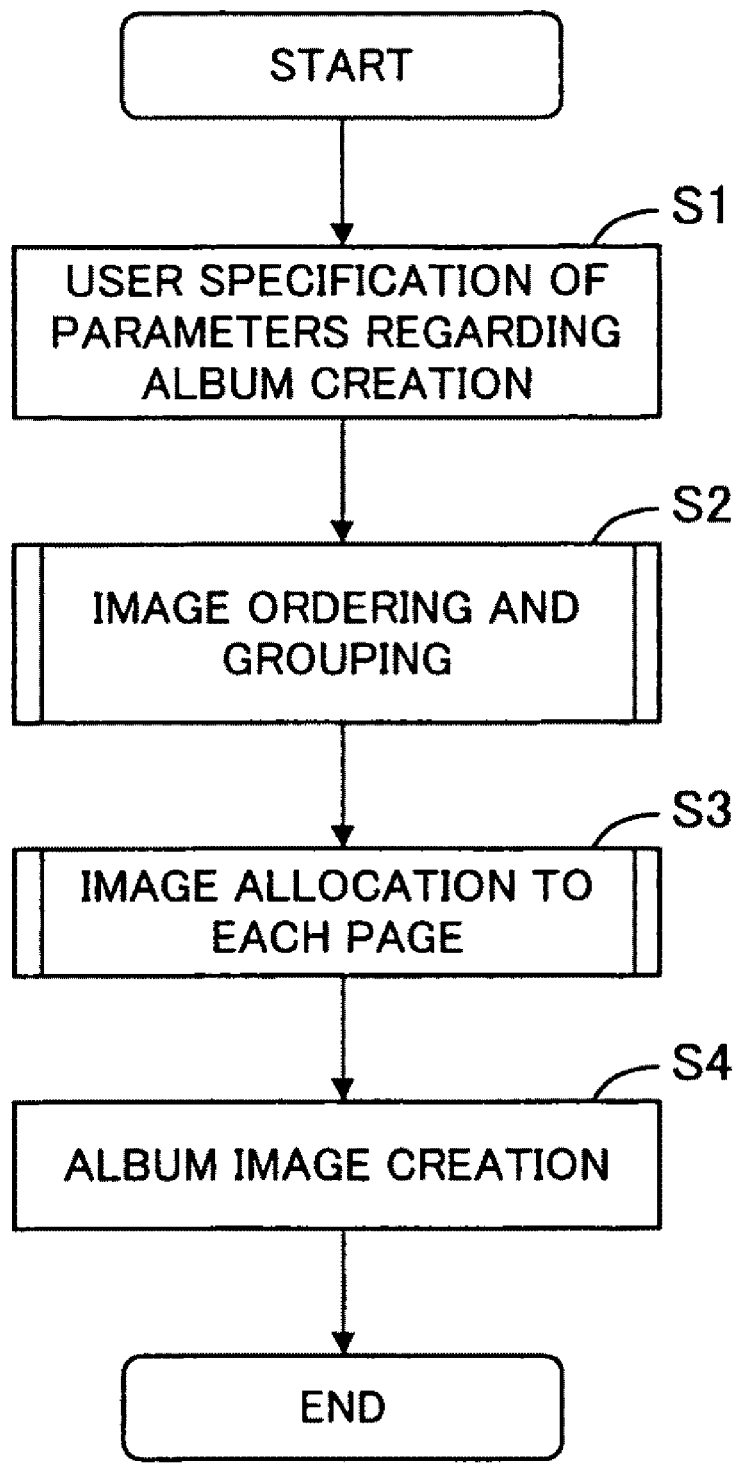
FIG. 2 is a flow chart showing the sequence of operations carried out in the embodiment.

FIG. 2 is a flow chart showing the sequence of operations executed in this embodiment. In step S1, the user specifies various parameters pertaining to the creation of an electronic album. This specification is carried out using a user interface screen displayed on a display device by the user interface module 212.

Figure 3:
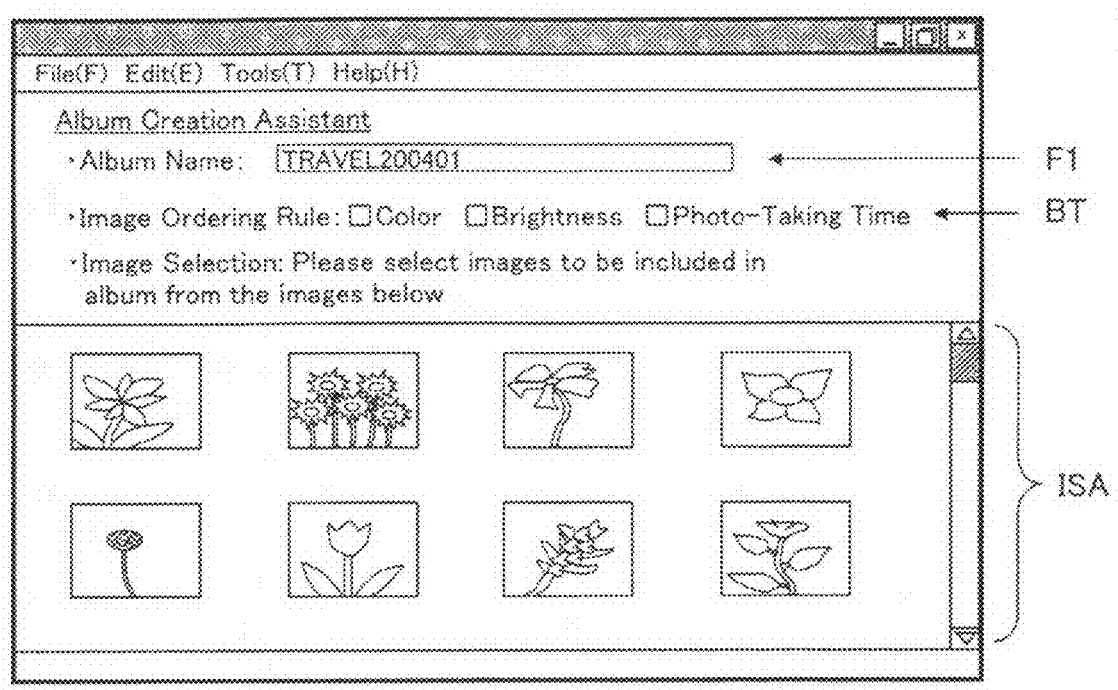
FIG. 3 is an explanatory drawing showing an example of a user interface screen used to specify album creation parameters.

FIG. 3 is an explanatory drawing showing an example of the user interface screen by which album creation parameters are specified. This user interface screen has a field F1 in which an album name is input, multiple buttons BT used to select an image ordering rule, and an image selection area ISA used to select images to be included into album.

An image ordering rule is a rule that prescribes the order of arrangement of images in album. In the example shown in FIG. 3, the three selectable rules of 'in order of color', 'in order of brightness' and 'in order of photo-taking time' are displayed. The 'in order of color' option means that the images will be arranged in the order of the representative color of each image (such as average hue value). The 'in order of brightness' option means that the images will be arranged in the order of the representative brightness value of each image (such as average brightness value), while the 'in order of photo-taking time' option means that the images will be arranged in the order of the time at which the image was captured, which information is obtained from the image file. Available image ordering rules may comprise any number of rules.

The 'representative color', 'representative brightness value' and 'photo-taking time' serve as image characteristic values used in the respective image ordering rules. As can be understood from the example shown in FIG. 3, the image ordering rules determine the order of images using mutually different types of image characteristic values. As these image characteristic values, values obtained from analysis of image pixel values, such as representative color or representative brightness value, or values obtained from attribute information created at the time of image capture of each image, such as the photo-taking time, may be used. However, it is preferred that the multiple image ordering rules include at least one rule that uses a characteristic value obtained from analysis of image pixel values. The reason for this is that if an image order is determined using a characteristic value determined based on the content of the images, an image order desirable to the user is more likely to result.

Once album creation parameters are specified, the order of a plurality of images is determined in step S2 based on the selected image ordering rule, and image grouping is performed. When this occurs, the image group selection module 214 (FIG. 1) first retrieves from the image storage unit 230 a plurality of images selected using the image selection area ISA. The image characteristic value acquiring module 216 then acquires an image characteristic value for each image. The image order determining module 218 determines the order of images and image groupings using the image characteristic values.

Figure 4:
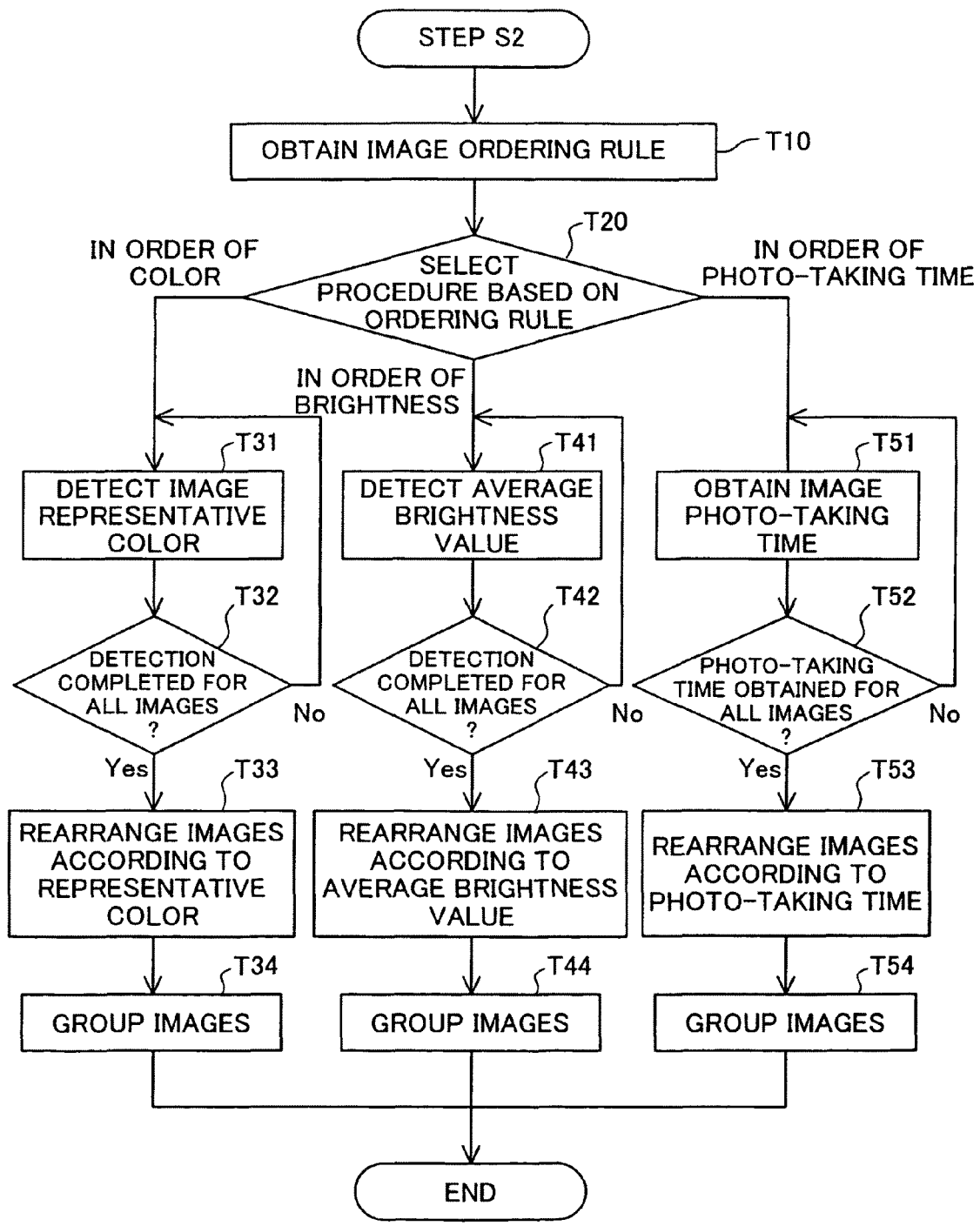
FIG. 4 is a flow chart showing the detailed sequence of operations carried out in step S2.

FIG. 4 is a flow chart showing the detailed sequence of operations executed in step S2. In step T10, the image characteristic value acquiring module 216 and the image order determining module 218 obtain the image ordering rule selected from the user interface screen, and in step T20, it is determined which of the three image ordering rules will be used to execute processing. Where the image ordering rule is 'in order of color', the steps T31-T34 are executed, where the image ordering rule is 'in order of brightness', the steps T41-T44 are executed, and where the image ordering rule is 'in order of photo-taking time', the steps T51-T54 are executed.

In the first two steps T31 and T32 which are to be executed when the 'in order of color' image ordering rule is used, the image characteristic value acquiring module 216 detects or calculates a representative color of each selected image. The representative color may constitute average color of the image, for example. The representative color can be expressed using any color space, but in this embodiment, a color space defined by H (hue), S (saturation) and V (value or lightness) is used.

When representative color detection is completed for all images, the image order determining module 218 rearranges the plurality of images in order in step T33 based on the representative color of each image. Any of various ordering methods may be used for the rearrangement here, such as the methods (A1-1) to (A1-3) shown below, for example.

(A1-1) The order of hue component (H component) value, ranging from 0 to 359 degrees (A1-2) The order of hue component (H component) value, ranging from a hue at the top of a rainbow to a hue at the bottom of the rainbow (A1-3) The order of hue component (H component) value, ranging from a hue at the bottom of a rainbow to a hue at the top of the rainbow The relationships between the hue component H and the six colors of the rainbow are as shown below, for example.

| | | |
|---|---|---|
| Red: | 340 ≦ H < 15 | (its standard H value = 0) |
| Orange: | 16 ≦ H < 45 | (its standard H value = 25) |
| Yellow: | 46 ≦ H < 65 | (its standard H value = 60) |
| Green: | 66 ≦ H < 165 | (its standard H value = 120) |
| Blue: | 166 ≦ H < 265 | (its standard H value = 210) |
| Violet: | 266 ≦ H < 339 | (its standard H value = 300) |

Because the images are arranged to ensure smooth changes in hue when the images are rearranged in the order of color, an image order that feels natural to the user can be provided. For example, where the album comprises numerous photographs of flowers as shown in FIG. 3, because these images become arranged in order of hue, arrangement order feels natural.

In step T34, the image order determining module 218 classifies the multiple rearranged images into multiple groups. The grouping method used here may be any of various methods, such as the methods (A2-1) and (A2-2) described below, for example.

Figure 5:
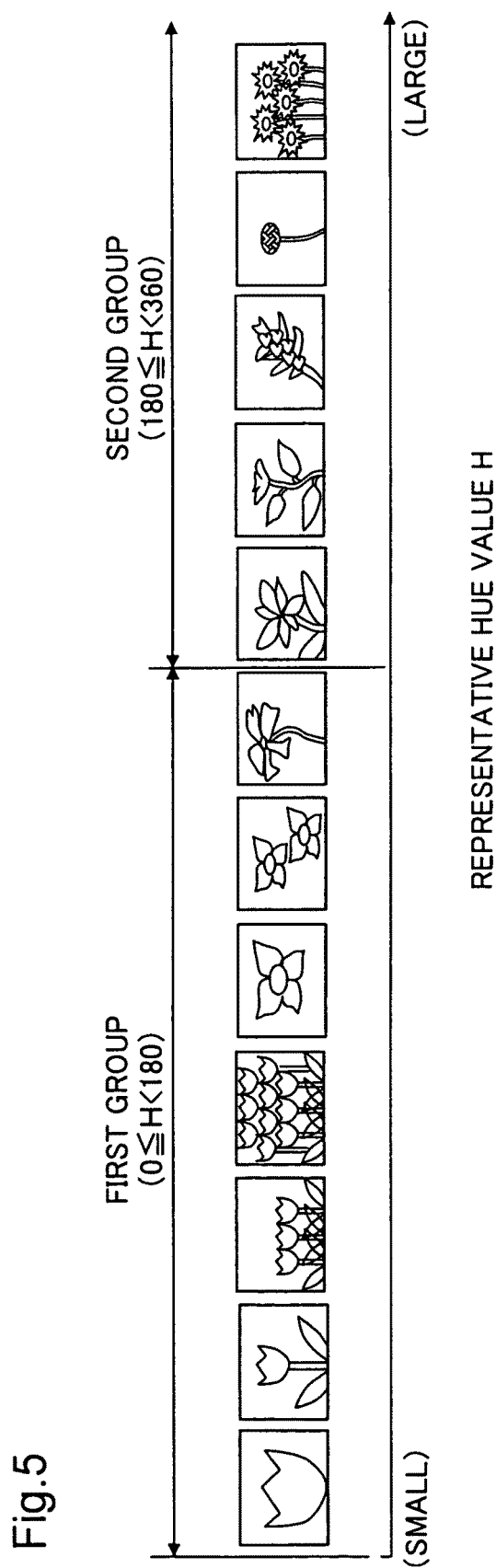
FIG. 5 is an explanatory drawing showing the grouping of images according to hue.

(A2-1) Grouping based on equal division of the entire hue value range (A2-2) Grouping based on seven hue value ranges corresponding to the seven rainbow color components FIG. 5 is an explanatory drawing showing the grouping of the plurality of images selected as material for an album into two groups based on the hue component H of the representative color. When grouping is carried out in order of the representative hue value H, images having similar colors can be grouped in the same group.

When grouping is completed, the processing proceeds from step S2 to step S3 (FIG. 2), which will be described later. Incidentally, the above described step T34 may be omitted, and all of the plurality of images may be grouped in a single group. Similarly, the steps T44 and T54 described below may also be omitted.

In the first two steps T41 and T42 which are to be executed when the 'in order of brightness' image ordering rule is used, the image characteristic value acquiring module 216 detects or calculates a representative brightness value of each selected image. In this embodiment, average brightness value of the image is used as the representative brightness value. When detection of the representative brightness value is completed for all images, the image order determining module 218 rearranges the plurality of images in order in step T43 based on the representative brightness value of each image. Any of various ordering methods may be used for the rearrangement here, such as the methods (B1-1) to (B1-4) shown below, for example.

(B1-1) The order in which average brightness value ranges from 'Bright (High)' to 'Dark (Low)'
(B1-2) The order in which average brightness value ranges from 'Dark' to 'Bright'
(B1-3) The order in which average brightness value ranges from 'Bright' to 'Dark ', and thereafter changes to 'Bright'
(B1-4) The order in which average brightness value ranges from 'Dark' to 'Bright', and thereafter changes to 'Dark'

In the method (B1-3), the plurality of images are alternately allocated to two groups starting with the darkest image, for example, and the order of arrangement for the images in each group is then established according to brightness. The same procedure may be used in the method (B1-4).

Here as well, as in the 'in order of color' method, because the images are rearranged to ensure smooth changes in brightness, an image order that feels natural to the user can be provided.

In step T44, the image order determining module 218 classifies the rearranged images into multiple groups. The grouping method used here may be any of various methods, such as the methods (B2-1) and (B2-2) described below, for example.

(B2-1) Grouping into N groups by dividing the range between the maximum average brightness value and the minimum average brightness value into N equal increments
(B2-2) Grouping into N groups by dividing average brightness value range such that each group has the same number of images In the first two steps T51 and T52 which is to be executed when the 'in order of photo-taking time' image ordering rule is used, the image characteristic value acquiring module 216 obtains the photo-taking time from the image file for each selected image. The photo-taking time can be obtained from the photo-taking parameter information stored in the image file or from the time at which the image file was created. In step T53, the image order determining module 218 rearranges the plurality of images in order based on the photo-taking time for each image. Any of various ordering methods may be used for the rearrangement, here, such as the methods (C1-1) and (C1-2) shown below, for example.

(C1-1) In ascending order according to the time at which the image was captured, starting with the earliest image
(C1-2) In descending order according to the time at which the image was captured, starting with the latest image In step T54, the image order determining module 218 classifies the multiple rearranged images into multiple groups. The grouping method used here may be any of various methods, such as the methods (C2-1) through (C2-5) described below, for example.

(C2-1) Grouping based on date of photo-taking
(C2-2) Grouping based on date of photo-taking plus a.m./p.m. difference
(C2-3) Grouping based on year of photo-taking
(C2-4) Grouping based on year and month of photo-taking
(C2-5) Grouping based on whether or not interval between photo-taking sessions falls within a prescribed interval Because the order of arrangement of a plurality of images is determined in accordance with an image characteristic value in step S2 as described above, a plurality of images can be arranged in a sequence that feels natural to the user.

The image rearrangement method used in step T33, T43 or T53, as well as the grouping method used in step T34, T44 or T54, may be a fixed method established in advance, or one of multiple method options that can be selected in advance by the user from the user interface screen.

When the image order and groupings are determined as described above, the page allocation module 220 allocates the images to each album page in step S3 (FIG. 2).

Figure 6:
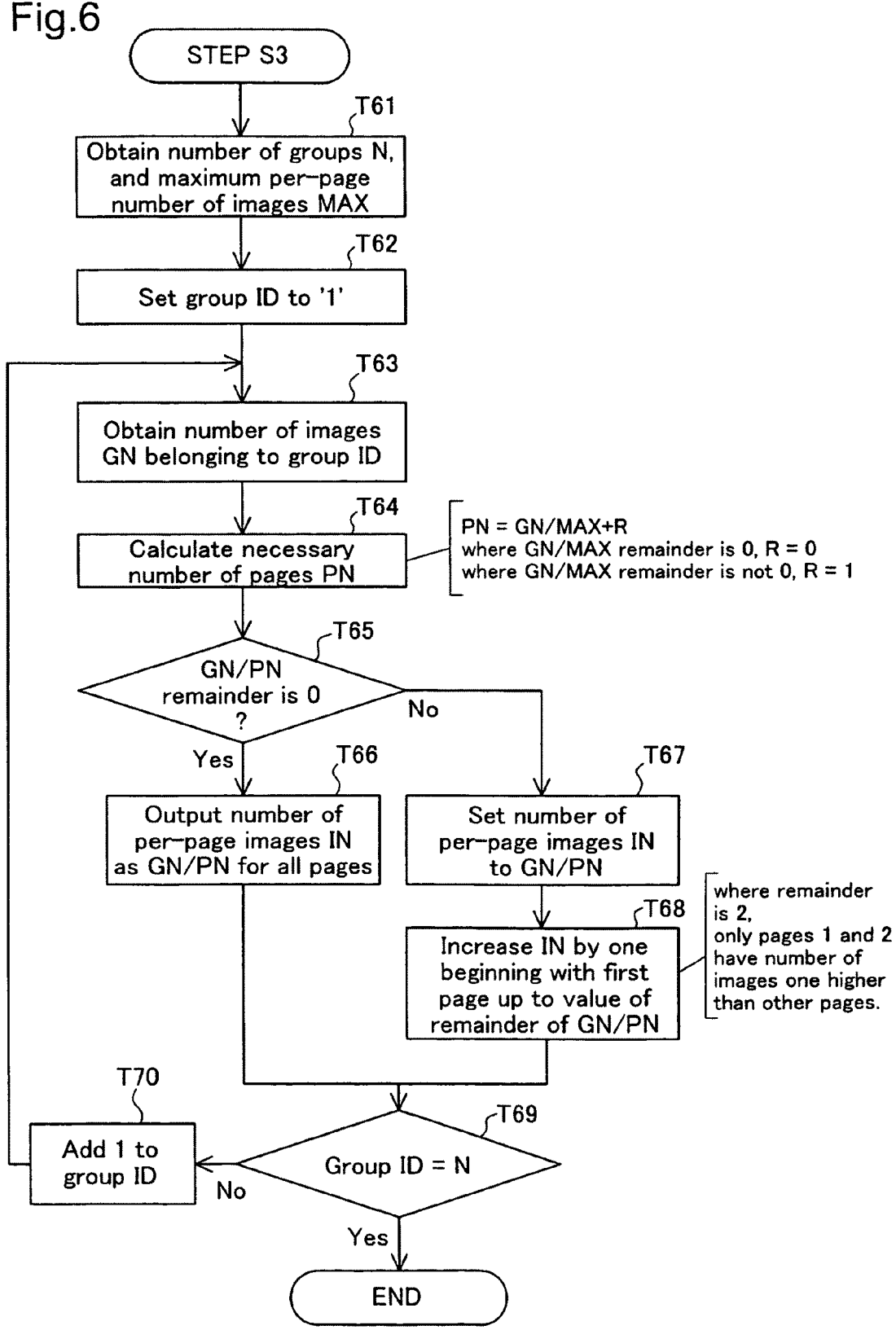
FIG. 6 is a flow chart showing the detailed sequence of operations carried out in step S3.

FIG. 6 is a flow chart showing the detailed sequence of operations executed in step S3. The number of groups N determined in steps T34, T44 or T54 in FIG. 4, as well as the predetermined per-page maximum number of images MAX, are obtained in step T61. The per-page maximum number of images MAX may be a fixed value, but it is preferred that it comprise a constituent element of the user interface screen such that it can be specified by the user.

In step T62, the group ID is set to '1'. The group ID is an identifier used to identify each group. The group having the ID set here is called the 'processing target group'.

In step T63, the number of images GN belonging to the processing target group is obtained. In the example shown in FIG. 5 described above, seven images belong to the first group, and five images belong to the second group.

In step T64, the number of pages PN needed in order to display all images in the processing target group is calculated using the equation (1) below.

$$PN = (GN/MAX) + R \tag{1}$$

The variable R on the right-hand side in above equation is '0' if the remainder from the quotient GN/MAX is zero, and is '1' if the remainder is a number other than zero.

In step T65, the number of images GN in the processing target group is divided by the required number of pages PN. If GN is evenly divisible by PN, i.e., if the remainder of (GN/PN) is zero, the per-page number of images IN is set to (GN/PN) for all pages in step T66. On the other hand, if GN is not evenly divisible by PN, the per-page number of images IN is set provisionally as the value of the quotient (GN/PN). The number of images IN is then incremented up by one only for the number of pages equivalent to such remainder in step T68. It is preferred that the pages subject to this image incrementing begin from the first page of the processing target group. For example, if the remainder of the division (GN/PN), i.e., the number of left-over images, is '2', the number of images IN on the first and second pages of the processing target group is increased to a number that is higher than the number of images on the other pages by one.

Adjustment of the per-page number of images IN carried out in step T68 can be executed according to a different method. For example, the left-over images can be distributed only to odd-numbered pages or to even-numbered pages. It is preferred that such a method be employed only where the number of left-over images does not exceed one-half of the value of the necessary number of pages PN. This ensures that the number of group images distributed to each page can be kept more or less consistent.

Once the per-page number of images in the processing target group is determined in this fashion, the process returns to step T63 via steps T69 and T70, and the processing of steps T63-T68 is repeated for the next group.

FIGS. 7A-7E show the per-page number of images determined according to the process shown in FIG. 6. As can be understood from these examples, the differences between the various numbers of images allocated to each page do not exceed 1. Therefore, variations in the per-page number of images can be minimized.

The processing shown in FIG. 6 is not limited to the image group processed as shown in FIG. 4, and in general, page allocation processing may be carried out for any group of a plurality of images for which an order of arrangement has been determined based on some sort of image ordering rule. Furthermore, page allocation processing need not be carried out based on a maximum number of images to be placed on each page, and a different method may be employed. For example, a method may be used in which a minimum number of images to be placed on each page is set and the per-page number of images is set so as to satisfy this minimum number. Alternatively, both a minimum number and a maximum number of images per page may be set, and the per-page number of images may be determined so as to fall within this range for each page.

When allocation of images to each page is completed, album creating module 222 creates album image data representing album images in step S4 (FIG. 2). FIG. 8 shows an example of album images in which a plurality of images shown in FIG. 5 comprise material for album images. The first group includes seven images, while the second group includes five images. This example is one in which the maximum per-page number of images MAX is set to four in the page allocation process shown in FIG. 6. According to the table of FIG. 7C, four images are allocated to the first page of the group containing seven images and three images are allocated to the second page of such group. Three images are allocated to the first page of the group containing five images, while two images are allocated to the second page of such group. The first and second groups in FIG. 8 are shown based on this allocation method.

In the example of FIG. 8, the same page template is used for a given group. Here, a 'page template' is a template that has multiple image frames (image placement areas). In FIG. 8, a common template having four image frames is provided to each page of the first group, while a common template having three image frames is provided to each page of the second group. However, because the number of images actually allocated to the second page of the first group and the second page of the second group (the fourth page of album) is smaller than the number of allocated image frames, a blank frame BF that contains no image is included. However, the image frame decoration may be erased for a blank frame BF. Furthermore, even for pages in the same group, different templates may be used in accordance with the number of images allocated to each page.

The electronic album created in this fashion may be printed by the printer 300 in response to a user instruction. It may also be registered on a server over a network and published over the network.

In this embodiment, because the images are arranged in accordance with a user-selected image order, the images can be placed in a natural arrangement according to the preferences of the user. Furthermore, because the images are automatically allocated based on the image arrangement order determined in this fashion and on the maximum number of images to be placed on each page of album, album can be easily created through a simple user instruction.

B. Variations:

B1. Variation 1:

In above embodiment, average hue value of image pixels is used as the representative color for purposes of the 'in order of color' image ordering rule, but various other values may be used as the representative color. For example, the colors expressed by average values Rave, Gave and Bave of the RGB components of the image pixels may be used as the representative colors. In another example, each image may be divided into multiple blocks, average hue value of each block may be sought, the blocks may be grouped according to hue value, and average hue value for the block group that includes the largest number of blocks may be used as the representative hue value for the image. As can be understood from this example, any characteristic value that represents an image can be used as the representative color of the image.

B2. Variation 2:

In above embodiment, color (or hue), brightness value and photo-taking time are used as image characteristic values for purposes of the image ordering rule, but various other values may alternatively be used as image characteristic values. For example, the result of frequency analysis of the image (frequency characteristic value) may be used as the image characteristic value.

B3. Variation 3:

Although a method and apparatus for creating an electronic album are described in the above embodiment, the image arrangement order determination and page allocation processes carried out according to this invention need not be performed only for the purpose of creating an electronic album, and may be put to some other use instead.

Although the present invention has been described and illustrated in detail, it is clearly understood that the same is by way of illustration and example only and is not to be taken by way of limitation, the spirit and scope of the present invention being limited only by the terms of appended claims.

What is claimed is:

1. A method for creating an electronic album including a plurality of images wherein the method is implemented by a computer, the method comprising:
    (i) displaying a plurality of image ordering rules on a display unit, one image ordering rule of the plurality of image ordering rules using a color of each of the plurality of images captured by one or more cameras;
    (ii) determining an order of arrangement of the plurality of images in accordance with a designated image ordering rule among the plurality of image ordering rules;
    (iii) determining the number of images to be placed on each page of the electronic album;
    (iv) creating, in accordance with the order of arrangement of the plurality of images and the number of images on each of the pages, an electronic album in which the plurality of images are arranged in order across multiple pages; and
    (v) displaying the electronic album on the display unit.

2. The method according to claim 1, wherein another image ordering rule of the plurality of image ordering rules uses a brightness of each of the plurality of images captured by one or more cameras.

3. The method according to claim 1, wherein another image ordering rule of the plurality of image ordering rules uses a photo-taking time of each of the plurality of images captured by one or more cameras.

4. The method according to claim 1, wherein the step (i) includes:

(a) classifying the plurality of images into multiple groups in accordance with the designated image ordering rule; and
(b) determining the order of arrangement of the plurality of images for each of the multiple groups.

5. The method according to claim 1, wherein
another image ordering rule of the plurality of image ordering rules uses a brightness of each of the plurality of images captured by one or more cameras, still another image ordering rule of the plurality of image ordering rules uses a photo-taking time of each of the plurality of images captured by one or more cameras, and
the step (i) includes:
(a) classifying the plurality of images into multiple groups in accordance with the designated image ordering rule; and
(b) determining the order of arrangement of the plurality of images for each of the multiple groups.

6. An apparatus for creating an electronic album including a plurality of images, the apparatus comprising:
a display unit configured to display a plurality of image ordering rules, one image ordering rule of the plurality of image ordering rules using a color of each of the plurality of images captured by one or more cameras;
an image order determining module configured to determine an order of arrangement of the plurality of images in accordance with a designated image ordering rule among the plurality of image ordering rules;
a page allocation module configured to determine the number of images to be placed on each page of the electronic album; and
an album creating module configured to create, in accordance with the order of arrangement of the plurality of images and the number of images on each of the pages, an electronic album in which the plurality of images are arranged in order across multiple pages.

7. The apparatus according to claim 6, wherein another image ordering rule of the plurality of image ordering rules uses a brightness of each of the plurality of images captured by one or more cameras.

8. The apparatus according to claim 6, wherein another image ordering rule of the plurality of image ordering rules uses a photo-taking time of each of the plurality of images captured by one or more cameras.

9. The apparatus according to claim 6, further comprising:
a classifying module configured to classify the plurality of images into multiple groups in accordance with the designated image ordering rule; and
an order determination module configured to determine the order of arrangement of the plurality of images for each of the multiple groups.

10. The apparatus according to claim 6, wherein
another image ordering rule of the plurality of image ordering rules uses a brightness of each of the plurality of images captured by one or more cameras,
still another image ordering rule of the plurality of image ordering rules uses a photo-taking time of each of the plurality of images captured by one or more cameras, and the apparatus further comprises:
a classifying module configured to classify the plurality of images into multiple groups in accordance with the designated image ordering rule; and
an order determination module configured to determine the order of arrangement of the plurality of images for each of the multiple groups.

11. A computer program product for creating an electronic album including a plurality of images, comprising:
a non-transitory computer readable medium; and
a computer program stored on the non-transitory computer readable medium, the computer program being operable for causing a computer to perform the following operations when executed:
displaying a plurality of image ordering rules on a display unit, one image ordering rule of the plurality of image ordering rules using a color of each of the plurality of images captured by one or more cameras;
determining an order of arrangement of the plurality of images in accordance with a designated image ordering rule among the plurality of image ordering rules;
determining the number of images to be placed on each page of the electronic album; and
creating, in accordance with the order of arrangement of the plurality of images and the number of images on each of the pages, an electronic album in which the plurality of images are arranged in order across multiple pages.

12. The computer program product according to claim 11, wherein another image ordering rule of the plurality of image ordering rules uses a brightness of each of the plurality of images captured by one or more cameras.

13. The computer program product according to claim 11, wherein another image ordering rule of the plurality of image ordering rules uses a photo-taking time of each of the plurality of images captured by one or more cameras.

14. The computer program product according to claim 11, wherein the operation of displaying a plurality of image ordering rules on a display unit includes:
classifying the plurality of images into multiple groups in accordance with the designated image ordering rule; and
determining the order of arrangement of the plurality of images for each of the multiple groups.

15. The computer program product according to claim 11, wherein
another image ordering rule of the plurality of image ordering rules uses a brightness of each of the plurality of images captured by one or more cameras,
still another image ordering rule of the plurality of image ordering rules uses a photo-taking time of each of the plurality of images captured by one or more cameras, and
the operation of displaying a plurality of image ordering rules on a display unit includes:
classifying the plurality of images into multiple groups in accordance with the designed image ordering rule; and
determining the order of arrangement of the plurality of images for each of the multiple groups.

* * * * *